US009870789B2

(12) United States Patent
Funayama

(10) Patent No.: US 9,870,789 B2
(45) Date of Patent: Jan. 16, 2018

(54) MAGNETIC DISK DEVICE AND HIGH-FREQUENCY ASSIST RECORDING METHOD

(71) Applicant: Kabushiki Kaisha Toshiba, Minato-ku, Tokyo (JP)

(72) Inventor: Tomomi Funayama, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/257,029

(22) Filed: Sep. 6, 2016

(65) Prior Publication Data

US 2017/0263272 A1    Sep. 14, 2017

(51) Int. Cl.
*G11B 5/09* (2006.01)
*G11B 5/39* (2006.01)
*G11B 20/12* (2006.01)
*G11B 5/17* (2006.01)

(52) U.S. Cl.
CPC .............. *G11B 5/3909* (2013.01); *G11B 5/09* (2013.01); *G11B 5/17* (2013.01); *G11B 20/1217* (2013.01)

(58) Field of Classification Search
None
See application file for complete search history.

(56) References Cited

U.S. PATENT DOCUMENTS

| 8,233,230 | B2 | 7/2012 | Yano et al. | |
| 8,810,954 | B1 | 8/2014 | Taguchi et al. | |
| 8,953,273 | B1* | 2/2015 | Funayama | G11B 5/012 360/46 |
| 8,982,502 | B2 | 3/2015 | Morinaga et al. | |
| 9,019,660 | B2* | 4/2015 | Funayama | G11B 5/314 360/125.3 |
| 9,105,279 | B2 | 8/2015 | Shiroishi | |
| 2009/0052095 | A1* | 2/2009 | Yamada | G11B 5/02 360/324 |
| 2009/0059417 | A1* | 3/2009 | Takeo | G11B 5/02 360/75 |
| 2010/0007992 | A1* | 1/2010 | Yamada | G11B 5/02 360/244 |
| 2013/0050866 | A1* | 2/2013 | Matsubara | G11B 5/3133 360/31 |
| 2013/0215530 | A1* | 8/2013 | Igarashi | G11B 5/1278 360/59 |

\* cited by examiner

*Primary Examiner* — Peter Vincent Agustin
(74) *Attorney, Agent, or Firm* — White & Case LLP

(57) ABSTRACT

According to one embodiment, a magnetic disk device includes a magnetic recording medium, a head including a recording magnetic pole, a spin torque oscillator provided near the recording magnetic pole, and a coil which excites the recording magnetic pole, a first current supply which supplies the coil with a first current corresponding to write data, a detector which detects a first signal corresponding to the write data, and outputs a second signal in accordance with the first signal, and a second power supply which varies, in accordance with the second signal, a second current supplied to the spin torque oscillator.

13 Claims, 9 Drawing Sheets

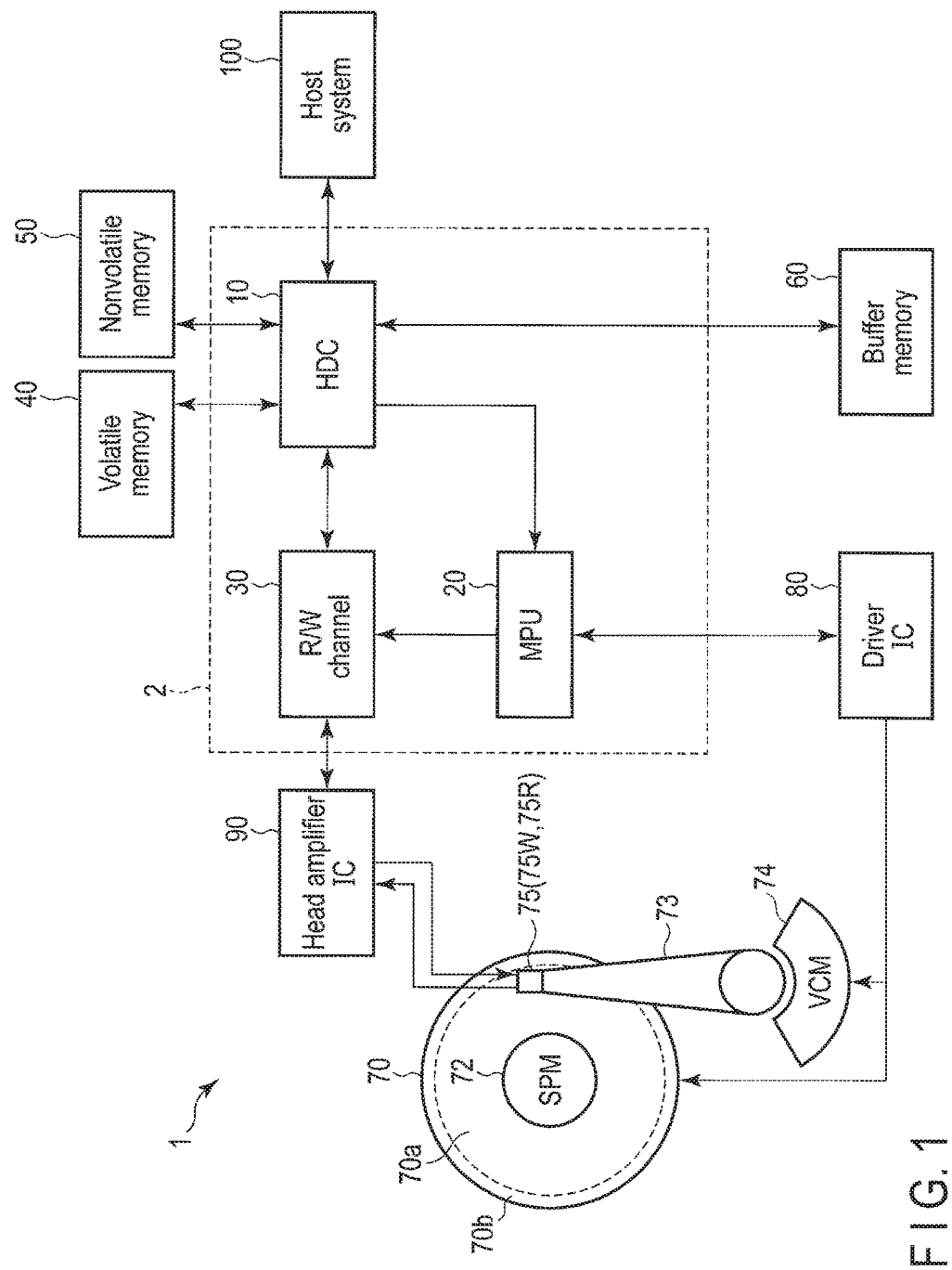
F I G. 1

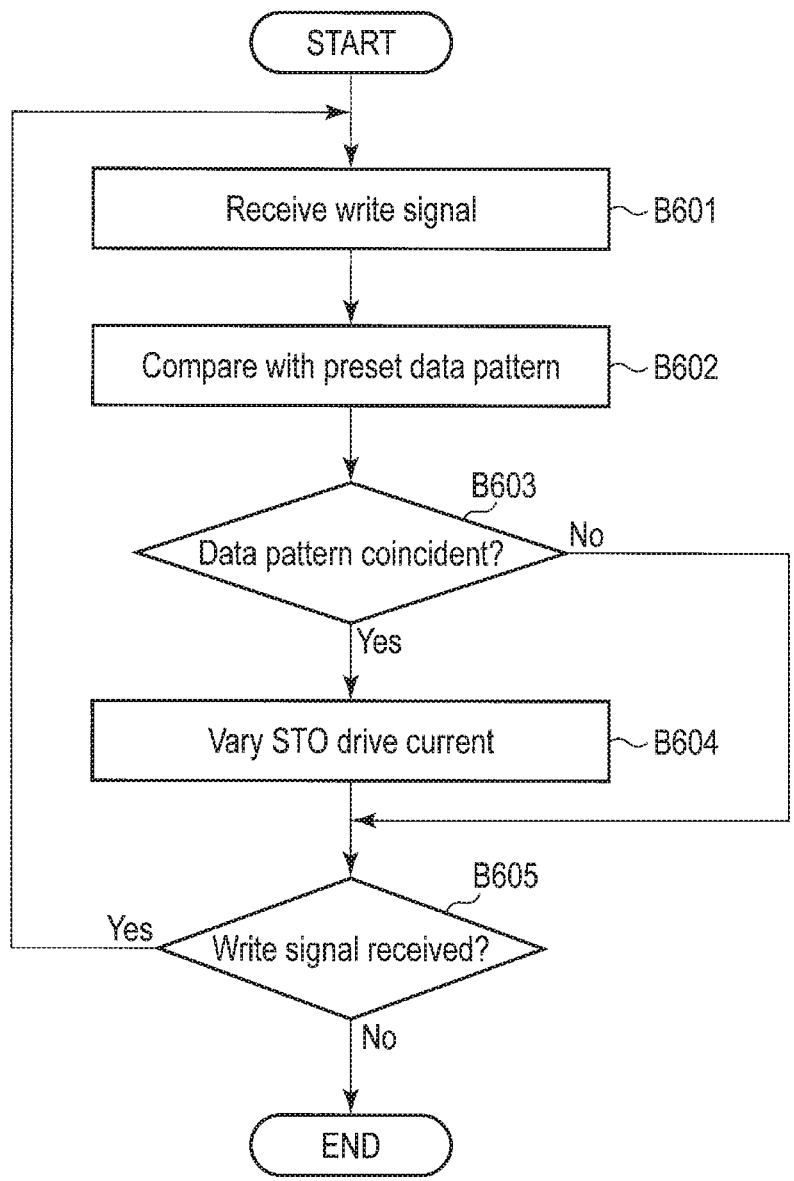
F I G. 6

| | 1 | 2 | 3 | 4 |
|---|---|---|---|---|
| Pattern 1 | 0 | 0 | 0 | 1 |
| Pattern 2 | 0 | 0 | 1 | 1 |
| Pattern 3 | 0 | 1 | 0 | 1 |
| Pattern 4 | 1 | 0 | 0 | 1 |
| Pattern 5 | 0 | 1 | 1 | 1 |
| Pattern 6 | 1 | 1 | 0 | 1 |
| Pattern 7 | 1 | 0 | 1 | 1 |
| Pattern 8 | 1 | 1 | 1 | 1 |

| | 1 | 2 | 3 |
|---|---|---|---|
| Pattern 1 | 0 | 0 | 1 |
| Pattern 2 | 0 | 1 | 1 |
| Pattern 3 | 1 | 0 | 1 |
| Pattern 4 | 1 | 1 | 1 |

MAGNETIC DISK DEVICE AND HIGH-FREQUENCY ASSIST RECORDING METHOD

CROSS-REFERENCE TO RELATED APPLICATIONS

This application is based upon and claims the benefit of priority from Japanese Patent Application No. 2016-047111, filed Mar. 10, 2016, the entire contents of which are incorporated herein by reference.

FIELD

Embodiments described herein relate generally to a magnetic disk device and a high-frequency assist recording method.

BACKGROUND

Recently, in the field of magnetic disk devices represented by a hard disk drive, a high-frequency assist recording system has been proposed as one recording system that can realize a higher recording density and a higher recording capacity.

The high-frequency assist recording system is a technique of applying, to a particular minute region in the write signal frequency area of a magnetic recording medium, such as a magnetic disk, a sufficiently high-frequency magnetic field compared to a write signal frequency, using a recording magnetic pole (main pole) that generates a magnetic field when a recording current is applied thereto, and a magnetic head having a high-frequency oscillator, thereby reducing the coercive force of the minute region to half or less than its original coercive force. The high-frequency oscillator is, for example, a spin torque oscillator (STO).

The magnetic disk devices employing the high-frequency assist recording system comprise, near the recording magnetic pole, a spin torque oscillator having an oscillation layer that oscillates when a current is supplied thereto. In these magnetic disk devices, a high-frequency magnetic field generated by the oscillation layer that has oscillated when a current is supplied to the spin torque oscillator is applied to a particular minute portion of the magnetic disk to reduce the coercive force of this portion. At this time, a recording magnetic field is applied by the recorder magnetic pole to the coercive-force reduced portion, thereby recording data on the portion of high magnetic anisotropic energy having a higher density recording potential than a normal magnetic disk.

In the spin torque oscillator of the above-mentioned magnetic head, the oscillation layer is provided near the recorder magnetic pole. A leak recording magnetic field from the recording magnetic pole is applied to the oscillation layer, which varies the recording magnetic field, and hence varies a gap magnetic field applied to the spin torque oscillator. That is, the oscillation frequency of the spin torque oscillator may change. This makes it difficult to realize stable high-frequency assist recording.

BRIEF DESCRIPTION OF THE DRAWINGS

FIG. 1 is a block diagram showing a magnetic disk device according to a first embodiment.

FIG. 6 is a flowchart of a high-frequency assist recording method according to the first embodiment.

DETAILED DESCRIPTION

In general according to one embodiment, a magnetic disk device comprises: a head comprising a recording magnetic pole, a spin torque oscillator provided near the recording magnetic pole, and a coil which excites the recording magnetic pole; a first current supply which supplies the coil with a first current corresponding to write data; a detector which detects a first signal corresponding to the write data, and outputs a second signal in accordance with the first signal; and a second power supply which varies, in accordance with the second signal, a second current supplied to the spin torque oscillator.

Now, one embodiment will be explained with reference to the drawings.

Embodiments

Figure 2:
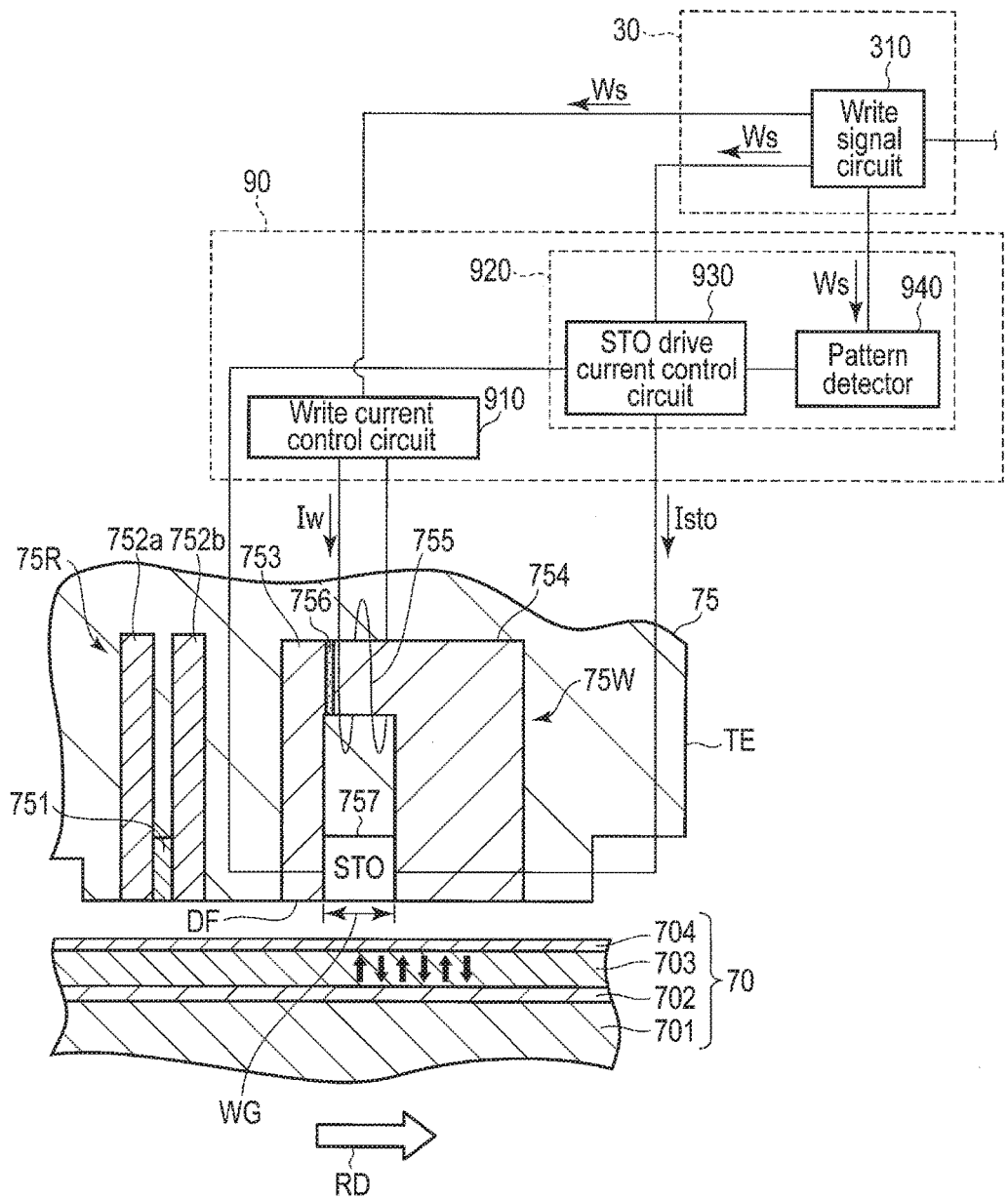
FIG. 2 shows an essential part of the magnetic disk device according to the first embodiment.

FIG. 1 is a block diagram showing a magnetic disk device 1 according to a first embodiment. FIG. 2 shows an essential part of the magnetic disk device according to the first embodiment.

The magnetic disk device 1 comprises a system controller 2 including a single-chip integrated circuit, a volatile memory 40, a nonvolatile memory 50, a buffer memory (buffer) 60, a driver IC 80, a head-disk assembly (HDA) described later, and a head amplifier integrated circuit (hereinafter, referred to as a head amplifier IC) 90. The magnetic disk device 1 is connectable to a host system (host) 100.

The system controller (controller) 2 is realized using, for example, a system-on-a-chip (SoC). The system controller 2 includes a hard disk controller (HDC) 10, a microprocessor (MPU) 20 and a read/write (R/W) channel 30.

The HDC 10 is connected to the host 100 and the R/W channel 30, and controls data transfer between the host system 100 and the R/W channel 30. The HDC 10 includes a host interface circuit connected to the host 100. The HDC 10 is also connected to the volatile memory 40, the nonvolatile memory 50 and the buffer memory 60.

The MPU 20 is a main controller that controls each component of the magnetic disk device 1. The MPU 20 is connected to the driver IC 80, described later, and controls a VCM 74 via the driver IC 80, thereby performing servo control for positioning a head 75. The MPU 20 also controls processing of writing data, and performs control of selecting the save destination of data transferred from the host 100.

The R/W channel 30 is connected to the HDC 10, the MPU 20 and the head amplifier IC 90 described later, and executes signal processing of read data and write data. As shown in FIG. 2, the R/W channel 30 comprises a write signal circuit 310. The write signal circuit 310 is connected to a recording current control circuit (first current supply) 910 and an STO current drive system (second current supply) 920, described later, and transmits thereto a write signal Ws obtained by modulating the write data. The R/W channel 30 has a circuit (not shown) or a function of measuring the signal quality of the read data.

The volatile memory 40 is a semiconductor memory in which saved data is lost when the supply of electrical power is interrupted. The volatile memory 40 stores, for example, data required for processing in each component part of the magnetic disk device 1. For instance, the volatile memory 40 is a synchronous dynamic random access memory (SDRAM).

The nonvolatile memory 50 is a semiconductor memory that holds saved data even if the supply of electrical power is interrupted. The nonvolatile memory 50 is, for example, a flash read-only memory (FROM).

The buffer memory 60 is a semiconductor memory that temporarily holds, for example, data transmitted between a disk 70 and the host 100. The buffer memory 60 may be formed integral with the volatile memory 40 as one body. The buffer memory 60 is formed of, for example, a dynamic random access memory (DRAM), a static random access memory (SRAM), an SDRAM, a ferroelectric random access memory (FeRAM), or a magnetoresistive random access memory (MRAM).

The HDA comprises the magnetic disk (hereinafter, referred to simply as the disk) 70, a spindle motor (SPM) 72, an arm 73 with the head 75 mounted thereon, and a voice coil motor (VCM) 74. The disk 70 is rotated by the spindle motor 72. The arm 73 and the VCM 74 constitute an actuator. The actuator moves the head 75 on the arm 73 to a particular position on the disk 70 in accordance with the rotation of the VCM 14. Two or more disks 70 and heads 75 may be employed.

The disk 70 has a data area including a recording area 70a that can be used by a user, and a system area 70b in which data necessary for system management is written. Further, the disk 70 is formed by sequentially stacking a nonmagnetic substrate 701, a soft-magnetic layer 702 as a foundation layer, a recording layer 703, and a protective layer 704 in this order. That is, the soft magnetic layer 702 is stacked on the substrate 701, the recording layer 703 is stacked on the soft magnetic layer 702, and the protective layer 704 is stacked on the recording layer 703. When vertical magnetization is controlled using a recording magnetic field applied by a recording magnetic pole that constitutes the write head 75W of the head 75 described later, the recording layer 703 holds data. In FIG. 2, arrow RD indicates the direction of rotation of the disk 70.

The head 75 comprises a slider as a main body, and a read head 75R and a write head 75W mounted on the slider. In the head 75, the main body of the slider is formed of alumina and is formed of a sintered body (AlTiC) of titanium carbide. FIG. 2 shows the slider of the head 75 that has a surface DF opposing the disk 70, and a trailing end TE.

The read head 75R comprises a magnetic film (magnetoresistive element) 751, and reads the magnetization direction of the recording layer 703 of the disk 70, i.e., magnetically recorded data (magnetic write data). The magnetic film 751 is interposed between two magnetic shield layers 752a and 752b for enhancing reproduction resolution. The lower ends of the magnetic film 751 and the two magnetic shield layers 752a and 752b are exposed to the slider surface DF of the head 75 opposing the disk. The magnetic film 751 is, for example, a GMR element or a TMR element.

The write head 75W comprises a main magnetic pole 753 constituting the recording magnetic pole, a trailing shield 754, a recording coil 755, an insulator 756, and a high-frequency oscillator, such as a spin torque oscillator (STO) 757. In the slider of the head 75, the write head 75W is provided closer to the trailing end TE than the read head 75R.

Figure 3:
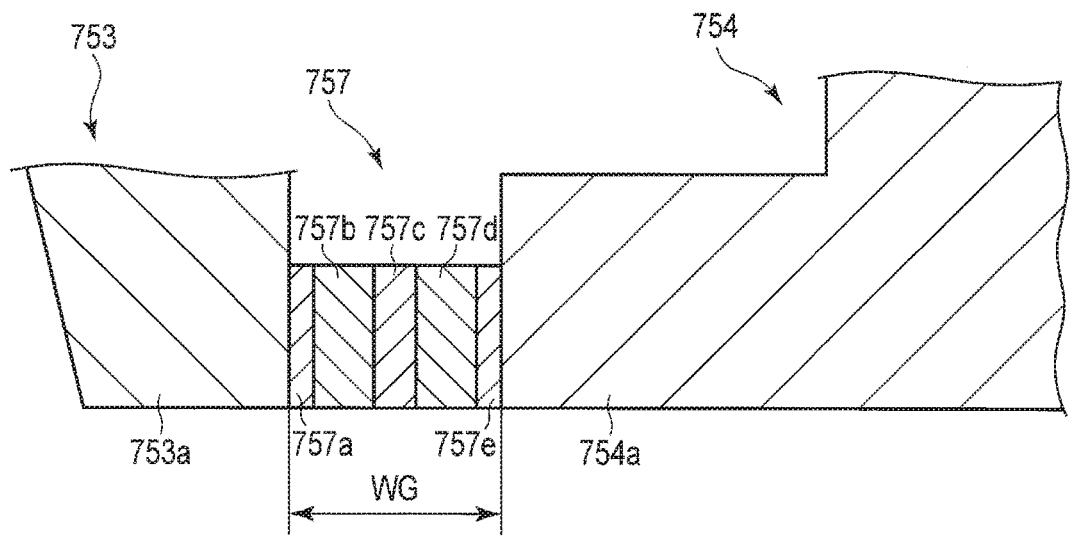
FIG. 3 is an enlarged view showing part of a write head according to the first embodiment.

FIG. 3 is an enlarged view showing part of the write head 75W according to the first embodiment.

The main magnetic pole 753 is incorporated in the write head 75W in a position close to the read head 75R. The main magnetic pole 753 substantially perpendicular extends to the surface DF opposing the disk, and is slightly tapered to a distal end 753a thereof, i.e., to the surface DF. Thus, the distal end 753a of the main magnetic pole 753 is exposed to the surface DF. The main magnetic pole 753 is formed of a highly saturated magnetization material that generates a perpendicular recording magnetic field relative to the surface of the disk 70. The main magnetic pole 753 generates a recording magnetic field when it is excited by the recording coil 755, described later, and applies the recording magnetic field to the recording layer 703 of the disk 70, thereby recording data on the recording layer 703.

The trailing shield 754 is incorporated in the write head 75W in a position closer to the trailing end TE side than the main magnetic pole 753. In the write head 75W, the trailing shield 754 is connected to the main magnetic pole 753 through the insulator 756 at a distance from the surface DF, and extends substantially perpendicularly from this connection to a distal end 754a on the surface DF side. The distal end 754a of the trailing shield 754 is angled in an L-shape toward the distal end 753a of the main magnetic pole 753, and a gap (write gap) WG is defined between the lower ends 753a and 754a. The distal end 754a of the trailing shield 754 is exposed to the surface DF. The trailing shield 754 is provided to efficiently close a magnetic path along with the soft magnetic layer 702 located just below the main magnetic pole 753.

The recording coil 755 is provided, wound around a magnetic circuit (magnetic core) including the main magnetic pole 753 and the trailing shield 754. The recording coil 755 excites the main magnetic pole 753 when a recording current Iw flows through the coil.

The spin torque oscillator (STO) 757 is provided in the write gap WG. The lower surface of the spin torque oscillator 757 is exposed to the disk-opposing surface DF of the slider of the head 75.

The spin torque oscillator 757 has a structure in which a foundation layer 757a as a nonmagnetic conductive layer, a spin injection layer 757b, an intermediate layer 757c, an oscillation layer 757d and a cap layer 757e as a nonmagnetic conductive layer, are stacked in this order from the distal end 753a side of the main magnetic pole 753 to the distal end 754a side of the trailing shield 754. The foundation layer 757a is formed in contact with the distal end 753a of the main magnetic pole 753. The cap layer 757e is formed in contact with the end face by the distal end 754a of the trailing shield 754 close to the main magnetic pole 753.

The spin injection layer 757b is formed of a Co/Ni artificial lattice having a high coercive force and a high spin polarization coefficient. Alternatively, the spin injection layer 757b may be formed of a material having a smaller coercive force than a gap magnetic field produced in the write gap WG during data recording. The intermediate layer 757c is formed of, for example, Cu having a long spin diffusion length, and the oscillation layer 757d is formed of, for example, soft magnetic FeCoNi having a high saturation flux density. Although in the embodiment, the foundation layer 757a, spin injection layer 757b, intermediate layer 757c, oscillation layer 757d and cap layer 757e are stacked in this order from the distal end 753a side of the main magnetic pole 753, the structure is not limited to this, but may be modified such that the foundation layer 757a, oscillation layer 757d, intermediate layer 757c, spin injection layer 757b, and cap layer 757e are stacked in this order from the distal end 753a side of the main magnetic pole 753.

When a drive current Isto is supplied to the spin torque oscillator 757, a gap magnetic field occurs in the write gap WG, whereby the magnetization of the oscillation layer 757d is uniformly rotated to generate, to the disk 70, a high-frequency magnetic field (microwaves) of a sufficiently high frequency compared to the frequency of the write signal Ws. When the spin torque oscillator 757 applies a high-frequency magnetic field to the recording layer 703 of the disk 70, the coercive force of the recording layer 703 is reduced.

The driver IC 80 controls the SPM 72 and the VCM 74 under control of the system controller 2 (more specifically, the MPU 20).

The head amplifier IC 90 includes a read amplifier and a write driver. The read amplifier amplifies a read signal read by the read head 75R, and transmits it to the read/write (R/W) channel 30. The write driver transmits, to the write head 75W, a write current corresponding to write data transmitted from the R/W channel 30.

The head amplifier IC 90 comprises a recording current control circuit 910, and an STO current drive system 920. The head amplifier IC 90 comprises a control circuit (not shown) for applying voltage or current to the read head 75R.

The recording current control circuit 910 is connected to the write signal circuit 310 and the recording coil 755 by, for example, a conducting wire. The recording current control circuit 910 applies, to the recording coil 755, a recording current Iw corresponding to the change of the write signal Ws received from the write signal circuit 310. As a result, the main magnetic pole 753 is excited by the recording coil 755 through which the recording current Iw passes, thereby generating a recording magnetic field corresponding to the write signal Ws.

Figure 4:
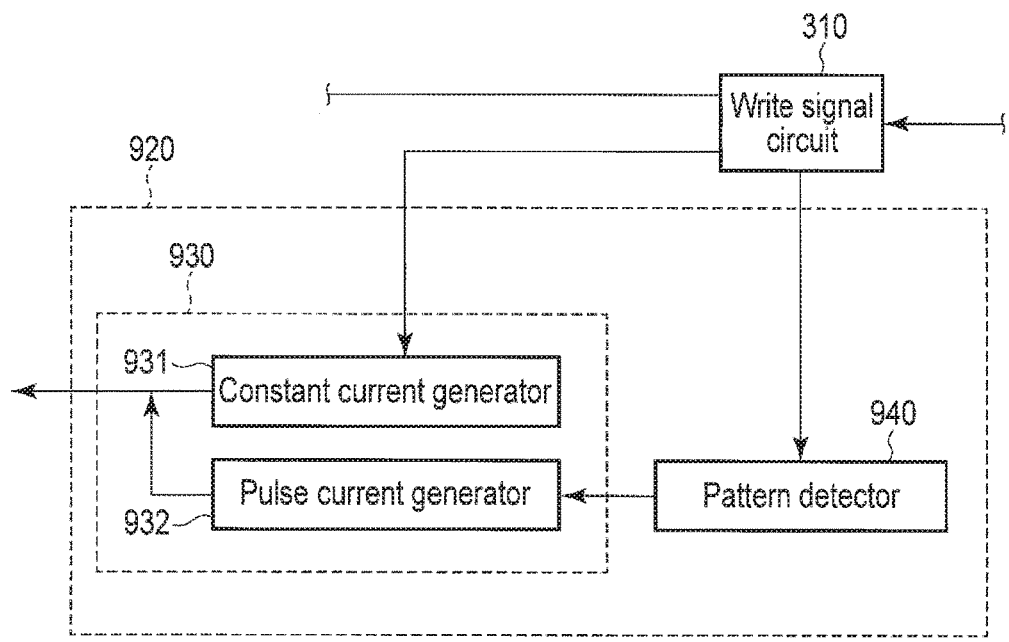
FIG. 4 is a block diagram showing an STO current drive system according to the first embodiment.

FIG. 4 is a block diagram showing the STO current drive system 920 of the embodiment.

The STO current drive system 920 comprises an STO drive current control circuit 930, and a pattern detector 940.

The STO drive current control circuit 930 comprises a constant current generator 931 and a pulse current generator 932.

The constant current generator 931 is connected to the write signal circuit 310 and the slider of the head 15 by means of, for example, a conductive wire. Since the constant current generator 931 is thus connected to the slider of the head 15, it is connected to the spin torque oscillator (STO) 757 through the main magnetic pole 753 and the trailing shield 754. In accordance with the data pattern of the write signal Ws received from the write signal circuit 310, the constant current generator 931 generates the STO drive current Isto, for example, a constant direct current, and supplies it to the spin torque oscillator 757. The "data pattern of the write signal Ws" may also be hereinafter referred to simply as the write signal Ws. Further, the term "pattern" may also include meanings of a data arrangement, data frequency, data transfer rate, etc.

The constant current generator 931 may be configured to distribute currents to the spin torque oscillator 757 and the recording coil 755 in accordance with the write signal Ws. In this case, the recording current control circuit 910 becomes unnecessary, but the number of connection terminals between the head 75 and the constant current generator 931 increases.

Upon receiving a particular signal, the pulse current generator 932 generates a current, such as a pulse current, for varying the STO drive current Isto. The pulse current generator 932 has, for example, a current-output-side conductive wire thereof connected to, for example, a conductive wire on the output side of the constant current generator 931.

The pattern detector 940 is connected to the write signal circuit 310 and the pulse current generator 932 by means of, for example, a conductive wire.

The pattern detector 940 receives the write signal Ws from the write signal circuit 310, and detects the data pattern of the received write signal Ws. The pattern detector 940 compares the data pattern (hereinafter, referred to as a detected pattern) of the write signal Ws received from the write signal circuit 310, with a preset data pattern (hereinafter, referred to as a set pattern). The pattern detector 940 transmits a particular signal to the pulse current generator 932 if the detected pattern coincides with the set pattern. The pattern detector 940 may be constructed such that it compares the signal waveform of the write signal Ws with a preset signal waveform, and transmits a predetermined signal to the pulse current generator 932. In this case, the pulse current generator 932 outputs a particular signal waveform upon receiving the particular signal.

If the STO drive current Isto is increased where the frequency of the recording current Iw is not high, the spin torque oscillator (STO) may not be able to perform stable assist recording. In view of this, the set pattern may be set to a data pattern for increasing the frequency of the recording current Iw. Alternatively, the pattern detection 940 may be configured to compare the detected pattern with the set pattern only when the frequency of the detected pattern is high.

Figure 5:
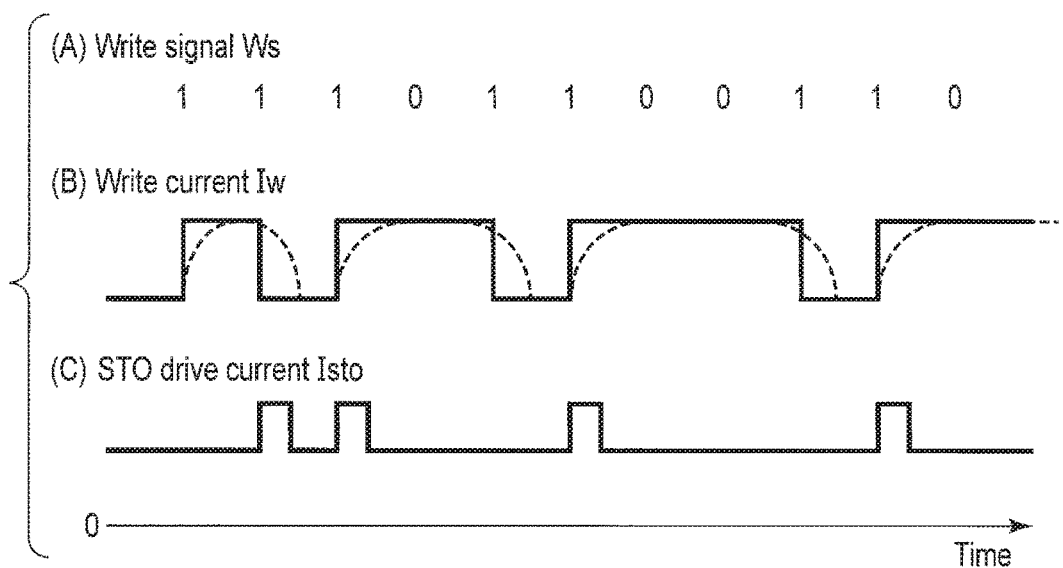
FIG. 5 is a view showing a relationship example between the data pattern of a write signal, an recording current corresponding to changes in the write signal, and the STO drive current.

FIG. 5 is a view showing a relationship example between the data pattern of the write signal Ws, an recording current Iw corresponding to the change of the write signal Ws, and the STO drive current Isto.

In FIG. 5, write signal Ws (A) indicates the data pattern of the write signal Ws transmitted from the write signal circuit 310, recording current Iw (B) indicates an ideal write current (indicated by the solid line) and an actual write current example (indicated by the broken line), and STO drive current Isto (C) indicates an STO drive current Isto that varies when the detected pattern coincides with the set pattern. Although FIG. 5 shows, using square waves, the ideal recording current Iw to be supplied to the recording coil 755, an actual recording current Iw smoothly varies at its rising and trailing portions when its polarity is reversed. Therefore, when the recording current Iw has a high frequency, its polarity may be reversed before reaching a desired level. Because of this, the gap magnetic field also assumes a lower level than a desired one, thereby reducing the oscillation frequency of the spin torque oscillator (STO) 757.

In FIG. 5, when the pattern detector 940 has detected a data pattern of two continuous "1" levels in the write signal Ws received from the write signal circuit 310, the recording current control circuit 910 transmits a particular signal for varying, for example, rising the STO drive current Isto at the second "1" level in the write signal Ws, i.e., the polarity reverse of the recording current Iw. Upon receiving the particular signal from the pattern detector 940, the pulse current generator 932 generates a pulse current in synchronism with the write signal Ws. At this time, the pulse current generator 932 applies a pulse current to STO driving current Isto output from the constant current generator 931. Accordingly, the spin torque oscillator (STO) 757 can generate a high-frequency magnetic field corresponding to the STO drive current Isto to which a pulse current that raises at the polarity reversal of the write signal Ws, namely, the write current Iw has been applied. As a result, the spin torque oscillator (STO) can always generate a stable high-frequency magnetic field when the STO drive current Isto varies in synchronism with the write signal Ws. That is, the magnetic disk device 1 can realize a stable high-frequency assist recording system.

FIG. 6 is a flowchart showing a high-frequency assist recording method according to the embodiment.

The pattern detector 940 receives, from the write signal circuit 310, the write signal Ws obtained by modulating write data (B601), and compares the data pattern of the received write signal Ws with a preset data pattern (B602).

The pattern detector 940 determines whether the data pattern of the received write signal Ws coincides with the preset data pattern (B603). If the data pattern (detected pattern) of the received write signal Ws coincides with the preset data pattern (set pattern) (YES of B603), the pulse current generator 932 outputs, in accordance with a signal received from the pattern detector 940, a pulse current for varying the STO drive current Isto output from the constant current generator 931 in accordance with the write signal Ws (B604).

If it determines that the data pattern of the received write signal Ws does not coincide with the preset data pattern (NO in B603), the pattern detector 940 determines whether the write signal Ws has newly been received from the write signal circuit 310 (B605).

If it has newly received the write signal Ws from the write signal circuit 310 (YES in B605), the pattern detector 940 proceeds to B601. If it has not received the write signal Ws from the write signal circuit 310 (NO in B605), the pattern detector 940 finishes the processing.

In the above-described embodiment, the magnetic disk device 1 varies the STO drive current Isto if the pattern detector 940 has detected a data pattern that coincides with the preset data pattern. In the magnetic disk device 1, the recording current control circuit 910 can stabilize the oscillation frequency of the spin torque oscillator 757 by varying the STO drive current Isto in synchronism with the write signal Ws at the rising and trailing edges of the recording current Iw. As a result, the magnetic disk device 1 can reliably execute high-frequency assist recording.

Figure 7:
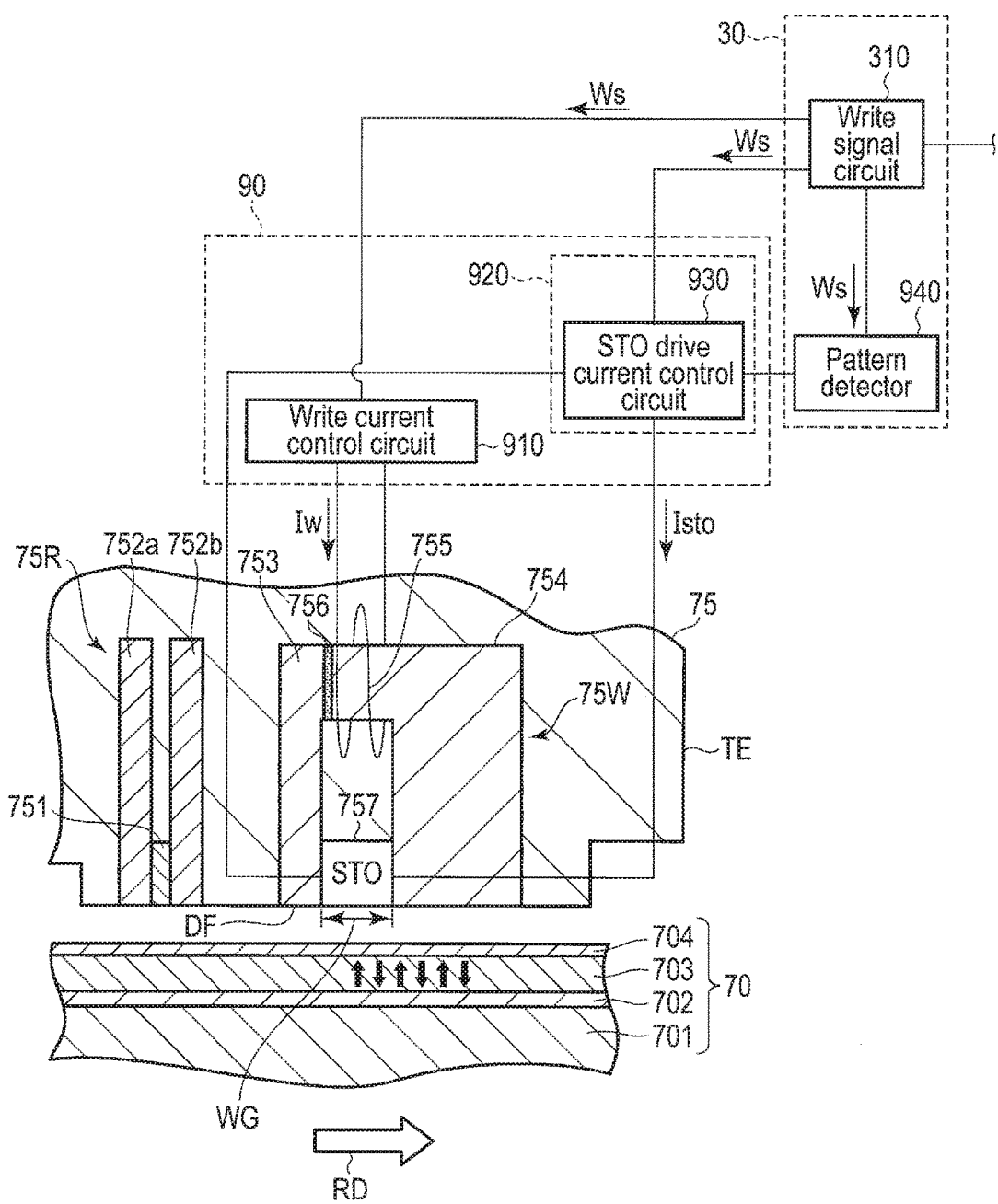
FIG. 7 shows an essential part of a magnetic disk device according to a first modification.

Although in the embodiment, the pattern detector 940 is included in the head amplifier IC 90, it may be included in the R/W channel 30 as shown in FIG. 7. Further, the pattern detection 940 may be provided independently between the R/W channel 30 and the head amplifier IC 90.

Furthermore, control, for example, of the STO current drive system 920 may be executed on firmware using the MPU 20.

Next, a magnetic disk device and an assist recording method according to another embodiment will be described. In this embodiment, elements similar to those of the above-described embodiment are denoted by corresponding reference numbers, and no detailed description will be given thereof.

Second Embodiment

A magnetic disk device 1 according to a second embodiment differs in that it employs a reference table including a plurality of set patterns.

Figures 8, 9:
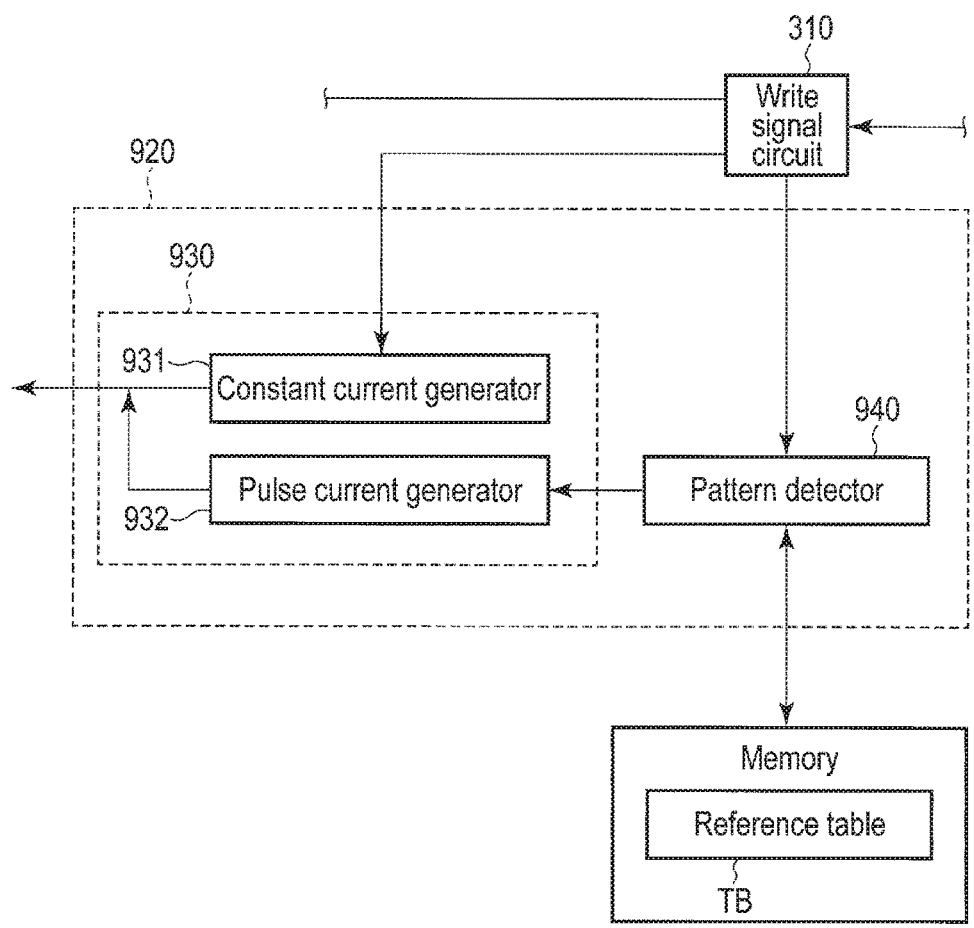
FIG. 8 is a block diagram showing an STO current drive system according to a second embodiment.
FIG. 9 shows a reference table example according to the second embodiment.

FIG. 8 is a block diagram showing an STO current drive system 920 according to the second embodiment.

The pattern detector 940 is connected to the write signal circuit 310, the pulse current generator 932, a memory for storing the reference table TB, such as the volatile memory 40 or the nonvolatile memory 50, etc. The pattern detector 940 may be connected to the volatile memory 40 and the nonvolatile memory 50 through the R/W channel 30.

When the pattern detector 940 detects a particular data pattern in the data pattern of the write signal Ws, it compares the detected pattern with a plurality of patterns preset in the reference table TB. If the detected pattern coincides with one of the set patterns, the pattern detector 940 transmits a particular signal to the pulse current generator 932 in order to vary, for example, increase the STO drive current in synchronism with the particular data in the data pattern of the write signal Ws.

FIG. 9 shows an example of a reference table according to the second embodiment. The reference table TB of FIG. 9 shows set patterns along the column, and the content (bits) of each pattern along the row. Thus, the reference table TB of FIG. 9 shows a plurality of 4-bit patterns. In FIG. 9, pattern 1 is (0, 0, 0, 1), pattern 2 is (0, 0, 1, 1), pattern 3 is (0, 1, 0, 1), pattern 4 is (1, 0, 0, 1), pattern 5 is (0, 1, 1, 1), pattern 6 is (1, 1, 0, 1), pattern 7 is (1, 0, 1, 1), and pattern 8 is (1, 1, 1, 1).

If the pattern detector 940 has detected a bit of "1" in the data pattern of the write signal Ws received from the write signal circuit 310, it compares, with the plurality of set patterns stored in the reference table TB, a detected pattern that includes the bit of "1" currently detected in the data pattern of the write signal Ws, and 3 bits detected in the data pattern before the bit of "1".

If the detected pattern coincides with one of the set patterns stored in the reference tablet TB, the pattern detector 940 transmits a particular signal to the pulse current generator 932. For instance, if the detected pattern coincides with one of patterns 2, 7 and 8 in the reference table TB, the pattern detector 940 transmits a particular signal to the pulse current generator 932 so as to vary the STO drive current "1" currently detected in the data pattern of the write signal Ws. In accordance with the particular signal from the pattern detector 940, the pulse current generator 932 varies the STO drive current Isto in synchronism with "1" currently detected in the data pattern of the write signal Ws. That is, the pulse current generator 932 varies the STO drive current Isto in synchronism with the polarity reverse of the recording current Iw that records "1" currently detected in the data pattern of the write signal Ws.

Figure 10:
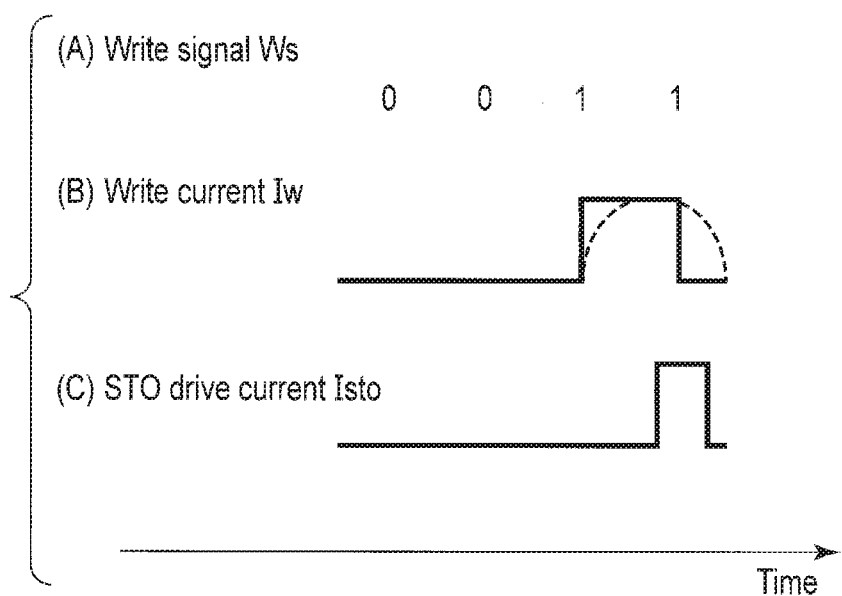
FIG. 10 is a view showing a relationship example between the data pattern of a write signal, an recording current corresponding to changes in the write signal, and an STO drive current.

FIG. 10 is a view showing a relationship example between the data pattern of the write signal Ws, the recording current Iw corresponding to changes in the write signal Ws, and the STO drive current Isto corresponding to the recording current Iw. In FIG. 10, write current Iw(B) indicates an ideal write current (indicated by the solid line) and an actual write current example (indicated by the broken line). In FIG. 10, no detailed description will be given of elements similar to those of FIG. 5.

In FIG. 10, in accordance with the particular signal from the pattern detector 940, the pulse current generator 932 varies the STO drive current Isto in synchronism with "1" (the fourth bit of the write signal Ws in (A) of FIG. 10) currently detected in the data pattern of the write signal Ws. That is, the pulse current generator 932 varies the STO drive current Isto corresponding to the trailing edge of the recording current Iw that records "1" (shown in (B) of FIG. 10) currently detected in the data pattern of the write signal Ws.

Figure 11:
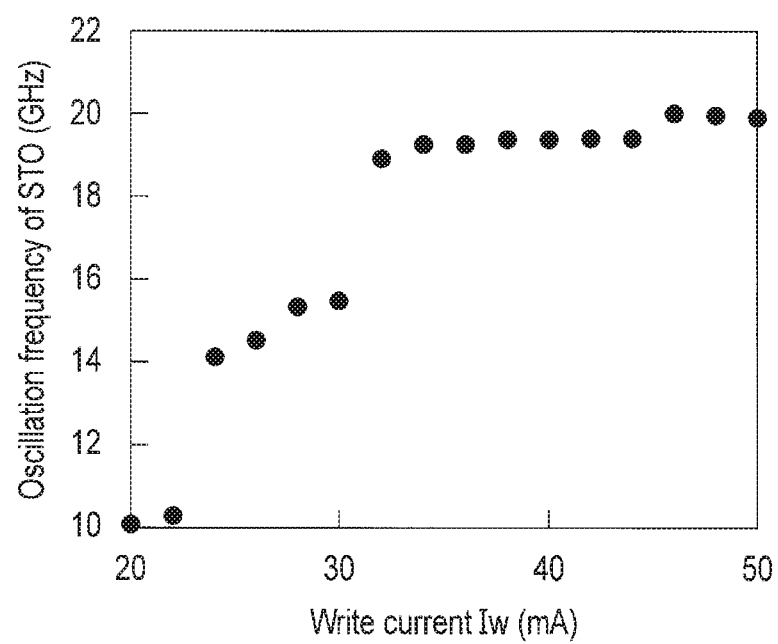
FIG. 11 is a graph showing a relationship example between the recording current and the oscillation frequency of a spin torque oscillator.

FIG. 11 is a graph showing a relationship example between the recording current Iw and the oscillation frequency of the spin torque oscillator (STO) 757. In FIG. 11, the vertical axis represents the oscillation frequency of the spin torque oscillator (STO) 757, and the horizontal axis represents the recording current Iw. In FIG. 11, it is assumed that the recording current Iw is set to 40 mA during data recording.

A description will now be given of a case where the STO drive current Isto output from the constant current generator 931 is not varied in accordance with the write signal Ws.

If the polarity of the head is reversed before the recording current Iw reaches the set value of 40 mA because the current Iw has a high frequency, for example, if the polarity of the head is reversed when the current Iw has reached 30 mA, a gap magnetic field corresponding to the recording current Iw of 30 mA occurs in the spin torque oscillator (STO) 757. In this case, the oscillation frequency of the spin torque oscillator (STO) 757 is reduced by about 4 GHz, compared to a gap magnetic field corresponding to the recording current Iw of 40 mA. This may cause the magnetic disk device 1 not to obtain a sufficient assist effect, resulting in an error during data writing.

Figures 12, 13:
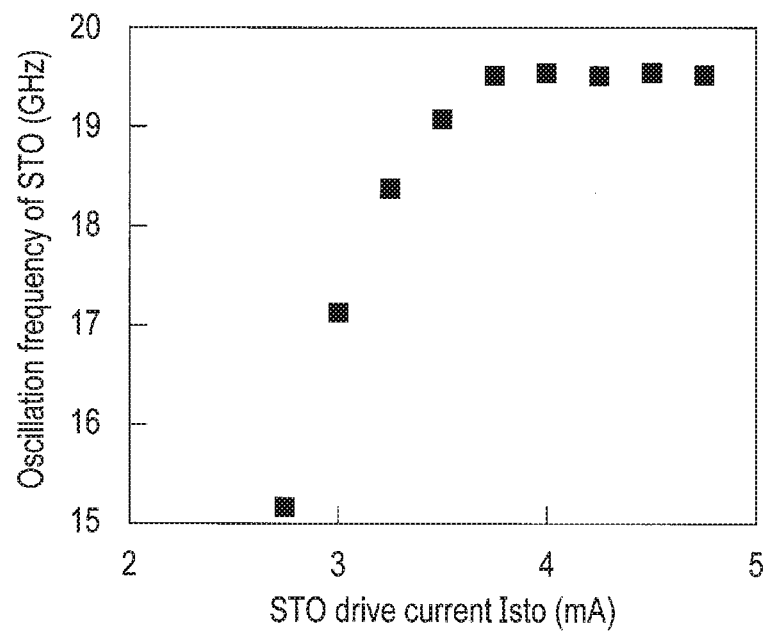
FIG. 12 is a graph showing a relationship example between the STO drive current and the STO oscillation frequency.
FIG. 13 is a reference table example according to a second modification.

FIG. 12 is a graph showing a relationship example between the STO drive current Isto and the STO oscillation frequency.

A description will be given of a case where the STO drive current Isto output from the constant current generator 931 is varied in accordance with the write signal Ws.

The constant current generator 931 supplies the spin torque oscillator 757 with an STO drive current Isto of, for example, 2.75 mA in accordance with the write signal Ws.

When the pattern detector 940 has detected particular data in the data pattern of a quickly varied write signal Ws, it compares a detected pattern detected in the data pattern of this write signal Ws with a plurality of set patterns present in the reference table TB. If the detected pattern coincides with one of the set patterns, the pattern detector 940 transmits a particular signal to the pulse current generator 932 corresponding to the particular data in the data pattern of the write signal Ws. In accordance with the particular signal received from the pattern detector 940, the pulse current generator 932 increases the STO drive current Isto, output from the constant current generator 931, in synchronism with the particular data in the data pattern of the write signal Ws. For example, as shown in FIG. 12, the STO drive current Isto is increased from 2.75 mA to 4 mA, and the oscillation frequency of the spin torque oscillator (STO) 757 is increased by about 4 GHz from about 15 GHz to about 19.5 GHz. Thus, reduction of the oscillation frequency of the spin torque oscillator (STO) 757 as shown in FIG. 11 can be suppressed by varying the STO drive current Isto in accordance with the write signal Ws. As a result, the magnetic disk device 1 can write data utilizing a sufficient assist effect.

In the embodiment, the magnetic disk device 1 can vary the STO drive current Isto when the pattern detector 940 has detected a data pattern that coincides with one of a plurality of preset data patterns. This enables the data pattern of the write signal Ws for varying the STO drive current Isto to be set in more detail than in the first embodiment.

In addition, the patterns set in the reference table TB of the second embodiment are just examples, and are varied depending upon conditions, such as the data transfer speed, the recording current Iw, overshooting of the recording current Iw, and the phase of the recording current Iw. Furthermore, the set patterns are not limited to such 4-bit data patterns as shown in FIG. 9, but may be 2- or 3-bit data patterns.

FIG. 13 is an example of the reference table TB according to a second modification. In the table TB of FIG. 13, no detailed description will be given of the elements similar to those of FIG. 9. In the table TB of FIG. 13, a plurality of 3-bit data patterns are set. In FIG. 13, pattern 1 is (0, 0, 1), pattern 2 is (0, 1, 1), pattern 3 is (1, 0, 1), and pattern 4 is (1, 1, 1).

For instance, if the pattern detector 940 has detected "1" in the data pattern of the write signal Ws received from the write signal circuit 310, it compares, with a plurality of set patterns stored in the reference table TB, a detected pattern that includes the bit of "1" currently detected in the data pattern of the write signal Ws, and 2 bits detected in the data pattern before the bit of "1".

For example, if the detected pattern coincides with one of patterns 2 and 4 in the reference table TB, the pattern detector 940 transmits, to the pulse current generator 932, a particular signal for varying the STO drive current in synchronism with "1" currently detected in the data pattern of the write signal Ws.

Yet alternatively, the set pattern may be a data pattern of more than 4 bits. Moreover, different conditions may be set for varying the STO drive current at different radial positions on the disk 70. For example, in the magnetic disk device 1, reference tables TB may be employed in respective zones into which the disk 70 is circumferentially divided at regular intervals.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk device comprising:
a head comprising a recording magnetic pole, a spin torque oscillator provided near the recording magnetic pole, and a coil which excites the recording magnetic pole;
a first current supply which supplies the coil with a first current corresponding to write data;
a detector which detects a first signal corresponding to the write data, and outputs a second signal in accordance with the first signal; and a second power supply which varies, in accordance with the second signal, a second current supplied to the spin torque oscillator, wherein the second power supply varies the second current by applying a third current thereto.

2. The magnetic disk device of claim 1, wherein the second power supply applies, to the second current, a pulse current that serves as the third current and varies in synchronism with polarity reversal of a first pattern of the first signal.

3. The magnetic disk device of claim 1, wherein the second power supply comprises a first current generator which generates the second current, and a second current generator which applies the third current to the second current in accordance with the second signal.

4. The magnetic disk device of claim 2, wherein the detector outputs the second signal when the first pattern coincides with a preset second pattern.

5. The magnetic disk device of claim 2, wherein when the first pattern detected comprises 2-bit data including sequential bits of 1, the detector outputs the second signal.

6. The magnetic disk device of claim 2, wherein when the first pattern coincides with a third pattern included in a plurality of preset patterns, the detector outputs the second signal.

7. The magnetic disk device of claim 5, wherein when the detector detects first data of 1 bit in the first pattern, the detector acquires second data of a particular number of bits detected before detection of the first data; and when the first pattern includes the first data and the second data detected in a mentioned order, and coincides with a fourth pattern, the detector outputs the second signal.

8. A high-frequency assist recording method for a magnetic disk device comprising: a head comprising a recording magnetic pole, a spin torque oscillator provided near the recording magnetic pole, and a coil which excites the recording magnetic pole; a first current supply which supplies the coil with a first current corresponding to write data; a detector and a second power supply, the method comprising:

detecting a first signal indicating the write data, and outputting a second signal in accordance with the first signal;

varying, in accordance with the second signal, a second current supplied to the spin torque oscillator; and varying the second current by applying a third current thereto.

9. The method of claim 8, further comprising applying, to the second current, a pulse current that serves as the third current and varies in synchronism with polarity reversal of a first pattern of the first signal.

10. The method of claim 9, further comprising outputting the second signal when the first pattern coincides with a preset second pattern.

11. The method of claim 9, further comprising outputting the second signal when the first pattern detected comprises 2-bit data including sequential bits of 1.

12. The method of claim 9, further comprising the outputting the second signal when the first pattern coincides with a third pattern included in a plurality of preset patterns.

13. The method of claim 11, further comprising:

acquiring second data of a particular number of bits detected before detection of the first data when the detector detects first data of 1 bit in the first pattern; and outputting the second signal when the first pattern includes the first data and the second data detected in a mentioned order, and coincides with a fourth pattern.

* * * * *